(12) United States Patent
Williamson

(10) Patent No.: US 9,342,793 B2
(45) Date of Patent: May 17, 2016

(54) TRAINING A SELF-LEARNING NETWORK USING INTERPOLATED INPUT SETS BASED ON A TARGET OUTPUT

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 724 days.

(21) Appl. No.: 12/872,935

(22) Filed: Aug. 31, 2010

(65) Prior Publication Data

US 2012/0054131 A1    Mar. 1, 2012

(51) Int. Cl.
*G06N 5/00* (2006.01)
*G06F 1/00* (2006.01)
*G06N 99/00* (2010.01)

(52) U.S. Cl.
CPC ..................... *G06N 99/005* (2013.01)

(58) Field of Classification Search
CPC ....... G06Q 10/10; G06Q 30/02; G06Q 50/01; G06N 5/021
USPC ........................................................ 706/12
See application file for complete search history.

(56) References Cited

U.S. PATENT DOCUMENTS

| | | | |
|---|---|---|---|
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |
| 2002/0087516 A1 | 7/2002 | Cras et al. | |

(Continued)

OTHER PUBLICATIONS

Answering Joint Queries from Multiple Aggregate OLAP Databases, Pourabbas et al, LNCS 2737, pp. 24-34, 2003.

(Continued)

*Primary Examiner* — Stanley K Hill
*Assistant Examiner* — Kalpana Bharadwaj
(74) *Attorney, Agent, or Firm* — Lowenstein Sandler LLP

(57) ABSTRACT

Embodiments relate to systems and methods for training a self-learning network using interpolated input sets based on a target output. A database management system can store sets of operational data, such as financial, medical, climate or other information. A user can input or access a set of target data, representing an output which a user wishes to be generated from an interpolated set of input data. The interpolation engine can generate a conformal interpolation function and input sets that map to the set of target output data. After interpolation, the interpolation engine can transmit the interpolated inputs, along with the set of target output data and other information, to a self-learning network such as a neural or fuzzy logic network. The self-learning network can be trained to converge to the target output based on the interpolated input results as generated by the interpolation engine, thus reproducing the desired interpolation function.

20 Claims, 8 Drawing Sheets

(56) References Cited

U.S. PATENT DOCUMENTS

| | | |
|---|---|---|
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2004/0184657 A1* | 9/2004 | Lin et al. ............... 382/159 |
| 2005/0004904 A1 | 1/2005 | Kearney et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0118399 A1* | 5/2007 | Avinash et al. ............ 705/2 |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2010/0057700 A1 | 3/2010 | Williamson |
| 2010/0057777 A1 | 3/2010 | Williamson |
| 2010/0131456 A1 | 5/2010 | Williamson |
| 2010/0138452 A1* | 6/2010 | Henkin et al. ........... 707/803 |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |
| 2012/0054212 A1 | 3/2012 | Williamson |
| 2012/0130979 A1 | 5/2012 | Williamson |
| 2012/0131014 A1 | 5/2012 | Williamson |
| 2012/0136824 A1 | 5/2012 | Williamson |
| 2012/0136879 A1 | 5/2012 | Williamson |
| 2012/0136880 A1 | 5/2012 | Williamson |
| 2012/0136903 A1 | 5/2012 | Williamson |
| 2012/0221500 A1 | 8/2012 | Williamson |
| 2012/0221503 A1 | 8/2012 | Williamson |
| 2012/0221584 A1 | 8/2012 | Williamson |
| 2012/0221585 A1 | 8/2012 | Williamson |

OTHER PUBLICATIONS

Hasan et al., "Using OLAP and Multidimensional Data for Decision Making", IEEE 2001 (all pages).

Messaoud et al., "A New OLAP Aggregation Based on the AHC Technique", DOLAP'04, Nov. 12-13, 2004 (all pages).

Yang et al., "Interactive Hierarchical Dimension Ordering, Spacing and Filtering for Exploration of High Dimensional Datasets", IEEE Symposium on Information Visualization 2003, Oct. 19-21, 2003 (all pages).

ASPFAQ.com, "What are the valid styles for converting datetime to string?", (2006) http://databases.aspfaq.com/database/what-are-the-valid-styles-for-converting-datetime-to-string.html (all pages).

* cited by examiner

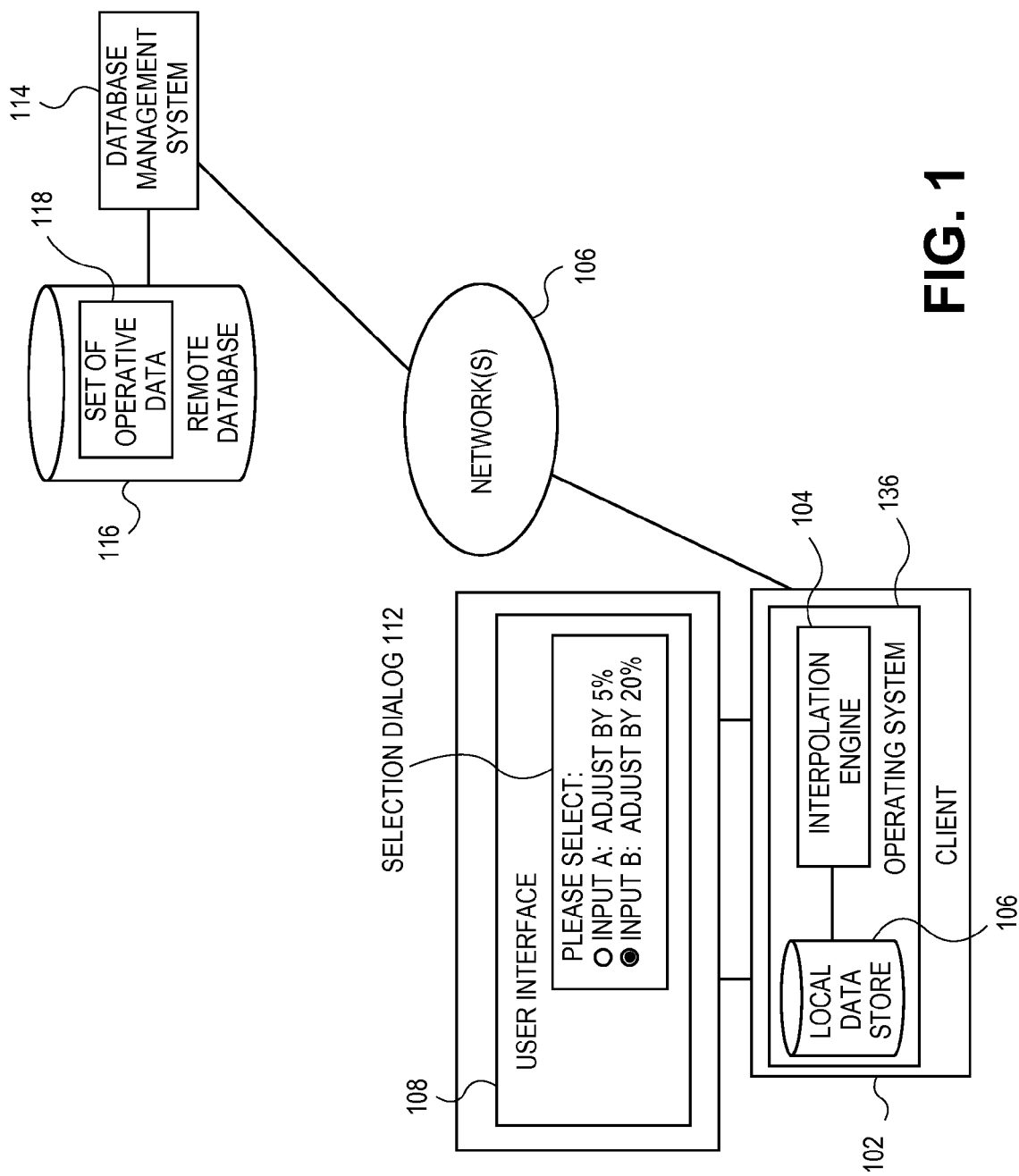

TRAINING A SELF-LEARNING NETWORK USING INTERPOLATED INPUT SETS BASED ON A TARGET OUTPUT

FIELD

The invention relates generally to systems and methods for training a self-learning network using interpolated input sets based on a target output, and more particularly, to platforms and techniques for configuring and training a self-learning network, such as a neural network or fuzzy logic network, to perform interpolation or modeling functions based on the recorded outputs from a separately operating interpolation engine.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In cases where an interpolation study is conducted, the ultimate selection of interpolated inputs and other data used to perform the interpolation may itself contain implied information regarding the appropriate breakdowns of the data, judgments about which inputs should receive priority compared to others, and other attributes of the eventual input breakouts and the interpolation function developed for that data. In cases, the values for the interpolated inputs may be introduced by an analyst or other user acting to adjust those interpolated values, to determine alternative solutions. In those and other cases, the interpolated inputs (or series of inputs) can reflect the behavior, decision logic, or judgment of the interpolation engine and/or its human operator. However, the potential value of those interpolated values or series of values as patterns for machine learning may not be exploited by the interpolation engines themselves. It may be desirable to provide systems and methods for training a self-learning network using interpolated input sets based on a target output, in which a self-learning network can access the set of interpolated inputs, the set of target output data, and/or other information used, produced, or processed by an interpolation platform, and receive that data as inputs that can be used to train a self-learning network to reproduce or approximate the same decision logic or input-output behavior in separately operating logic, which can then be used for additional or independent interpolation or modeling activity.

DESCRIPTION OF DRAWINGS

FIG. 1 illustrates an overall network architecture which can support the generation of interpolated input sets based on a target output, according to various embodiments of the present teachings;

DESCRIPTION

Figure 2A:
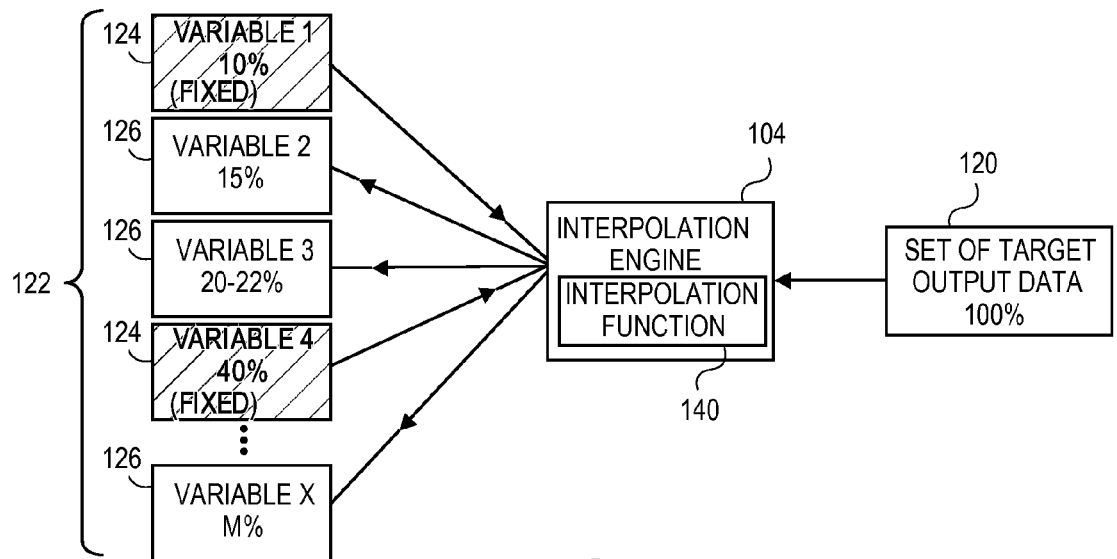
FIGS. 2A-2C illustrate various exemplary sets of input data, and series of sets of input data, that can be produced by interpolation techniques whose output and other data can be used in training a self-learning network using interpolated input sets based on a target output, according to various embodiments.

Embodiments relate to systems and methods for training a self-learning network using interpolated input sets based on a target output. More particularly, embodiments relate to self-learning networks which can operate on data produced or processed by interpolation platforms to learn or acquire decision making patterns or other decision logic related to input/output modeling. In terms the interpolated data which the self-learning network or networks can access and train on, that underlying data can be generated by interpolation platforms which access or retrieve a set of historical, operational, archival, or other operative data related to captured technical, financial, medical, or other operations, and supply that operative data to an interpolation engine. The interpolation engine can also be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for the interpolation platform can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data.

In cases, the interpolation engine can generate different combinations of the set of interpolated input data in different generations or series, to permit an analyst or other user to manipulate the input values, to observe different ramifications of different component values for the set of interpolated inputs. The user of that platform can be presented with a selector dialog or other interface to manipulate the set of interpolated input values, and select or adjust those values and/or the interpolation function used to generate those values. The analyst or other user can thereby determine scenarios and potential inputs that will combine to realize the desired solution in the form of the set of target output data, and the values conformally producing that output can be varied or optimized. The ability to analyze and derive input sets that will produce already-know or fixed output can thereby be automated in whole or part, permitting a user to investigate a broader array of analytic scenarios more efficiently and effectively.

After completion of those or other types of interpolation studies or reports, according to the present teachings, the interpolated input values and other data can be stored to a local or remote data store. According to embodiments of the present teachings, that data can then be accessed or retrieved by a self-learning network or logic, such as a fuzzy logic network or neural network. The self-learning network can then isolate one or more series of the interpolated values, and receive those values as inputs to an inference or self-learning engine to train its processing to produce the set of target output data or other data reference points, for instance using an iterative process on that data using successively refined weights. After reproducing or approximating the desired output based on the supplied input, the self-learning network can be stored and transmitted to another remote platform or location, for instance to perform interpolation or modeling activity consistent with the interpolated values and target output data. In regards, the self-learning network can thereby observe or learn from the interpolation behavior of the separate interpolation engine and/or human users, and reproduce that decision logic in other machines, services, or platforms, without requiring the same or different user and/or interpolation engine itself.

Consistent with the foregoing, in embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflected expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2B:
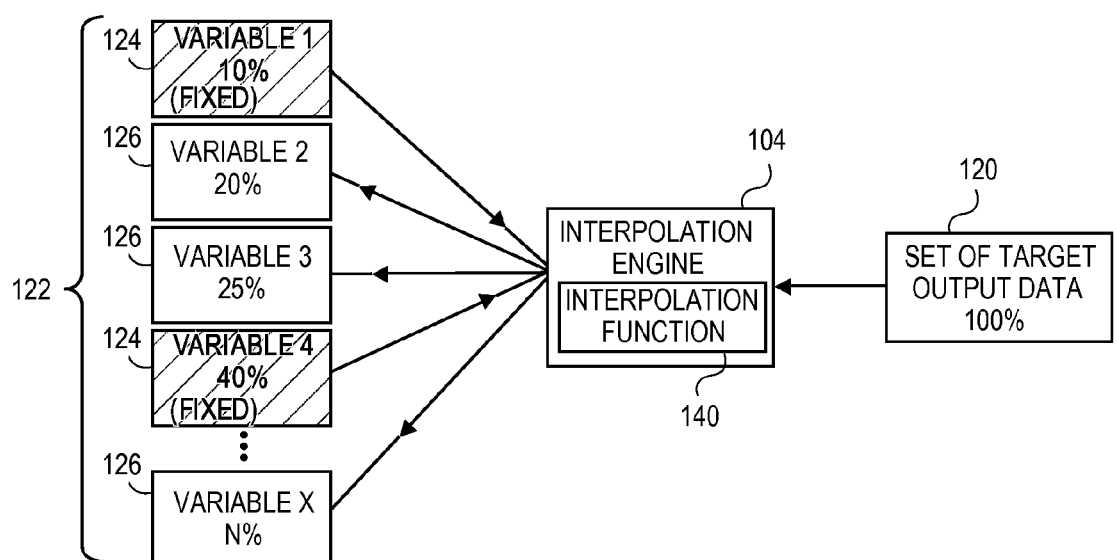
Figure 2C:
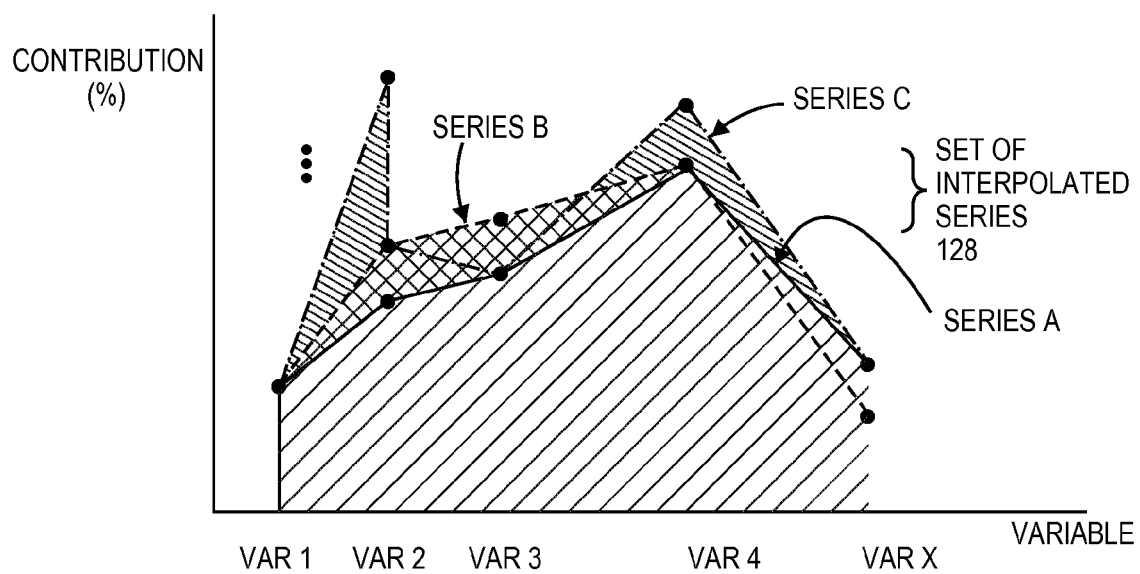

In embodiments, and as shown in FIGS. 2A-2C, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on even date herewith, having the same inventor as this application, assigned or under obligation of assignment to the same entity as this application, and incorporated by reference in its entirety herein, can be used in determining interpolation function 140, configuring and/or executing interpolation engine 104, and/or performing other related operations.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted and as shown in FIG. 2C, when the possible conformal set of interpolated inputs 126 is not unique, the interpolation engine 104 can generate a set of interpolated input series 128, each series containing a set of interpolated input data 126 which is different and contains potentially different interpolated inputs from other conformal data sets in the set of interpolated input series 128. In cases where such alternatives exist, the interpolation engine 104 can generate and present the set of interpolated input series 128, for instance, in series-by-series graphical representations or otherwise, to select, compare, and/or manipulate the results and values of those respective data sets. In embodiments, the analyst or other user may be given a selection or opportunity to choose one set of interpolated input data 126 out of the set of interpolated input series 128 for use in their intended application, or can, in embodiments, be presented with options to continue to analyze and interpolate the set of operative data 118, for example to generate new series in the set of interpolated input series 128. Other processing options, stages, and outcome selections are possible.

Figure 3:
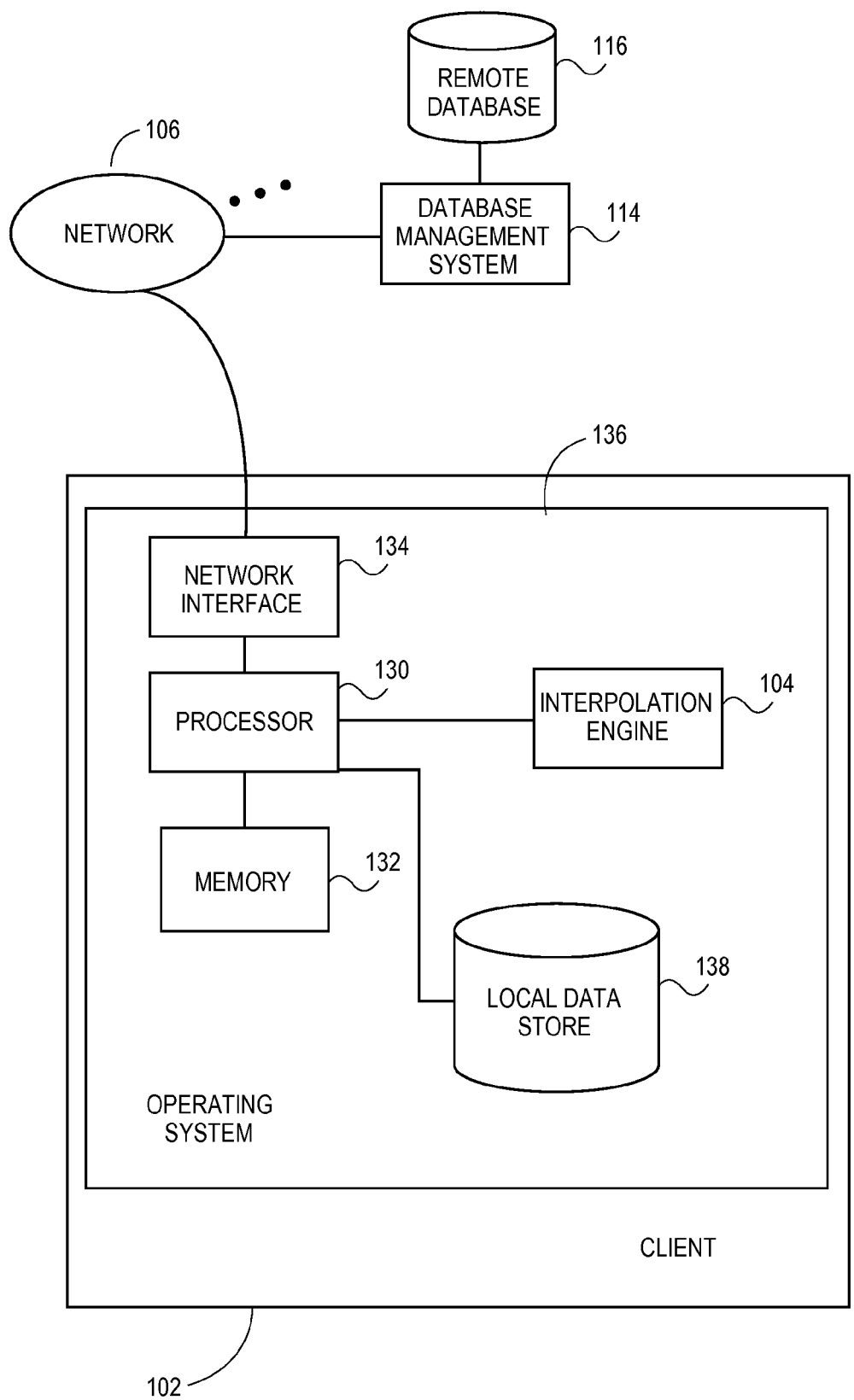
FIG. 3 illustrates an exemplary hardware configuration for client machine which can host or access interpolation processes whose output and related data can be used in systems and methods for training a self-learning network using interpolated input sets based on a target output, according to various embodiments.

FIG. 3 illustrates an exemplary diagram of hardware and other resources that can be incorporated in a client 102 that can a host self-learning network 142, interpolation engine 104, or otherwise be used in connection with systems and methods for training a self-learning network using interpolated input sets based on a target output, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 4:
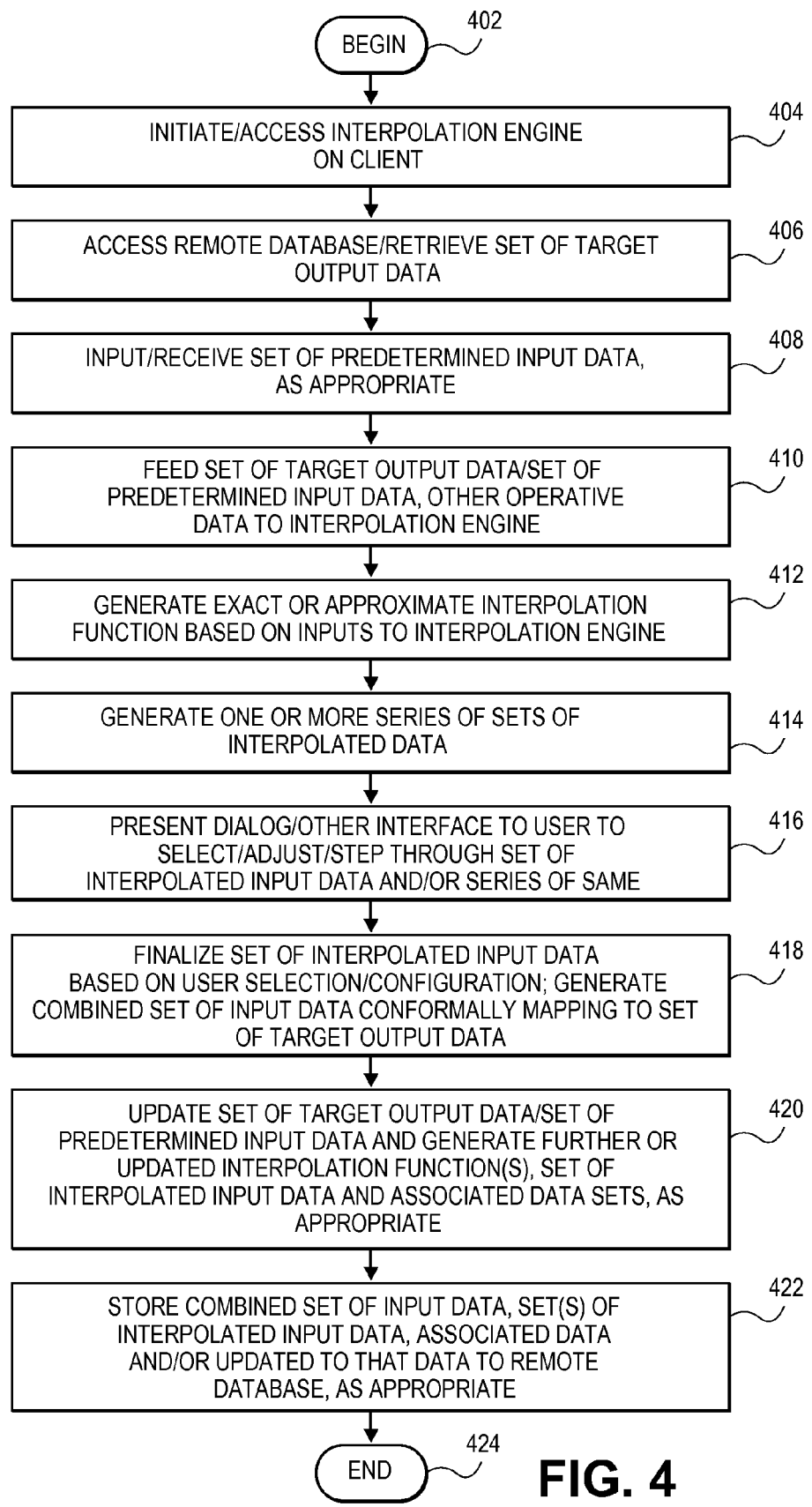
FIG. 4 illustrates a flowchart for overall interpolation, function determination, and other processing that can be used to produce conformal input sets based on a target output that can be used in systems and methods for training a self-learning network using interpolated input sets based on a target output, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120 the set of predetermined input data 124, and/or other, data, in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated input series 128 containing individual different combinations of subsets of interpolated input data 126. In aspects, the set of interpolated input data 126 and/or the set of interpolated input series 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or the set of interpolated input series 128 can be generated by producing sets of possible interpolated inputs which are then presented to the user via the selection dialog 112, for instance to permit the user to accept, decline, or modify the values of set of interpolated input data 126 and/or the set of interpolated input series 128.

In 416, the interpolation engine 104 can present the selection dialog 112 to the user to select, adjust, step through, and/or otherwise manipulate the set of interpolated input data 126 and/or the set of interpolated input series 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget, amounts for a second department or to permit greater investment in IT (information technology) upgrades in a third department. In aspects, the selection dialog 112 can permit the adjustment of the set of interpolated input data 126 and/or set of interpolated input series 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the set of interpolated input series 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

According to embodiments of the present teachings, the set of combined input data 122, the set of target output data 120, and/or other information generated by the interpolation engine 104 and/or other logic can be used to provide input to a separate local and/or remote self-learning network, such as a fuzzy logic network or a neural network. In embodiments involving the feeding of such interpolation data to a self-learning network, the self-learning network can receive and be trained to respond in the same or similar fashion as the interpolation engine 104, as guided by a human operator or otherwise, to the same classes or types of data processed by the interpolation engine 104 itself. The self-learning network can thereby become trained or configured to generate a forward or modeling output that duplicates or approximates the outputs produced by one or more set of combined inputs 122, and/or can become trained or configured to generate an interpolation output that duplicates or approximates the set of interpolated inputs 126 generated by interpolation engine 104, itself.

Figure 5:
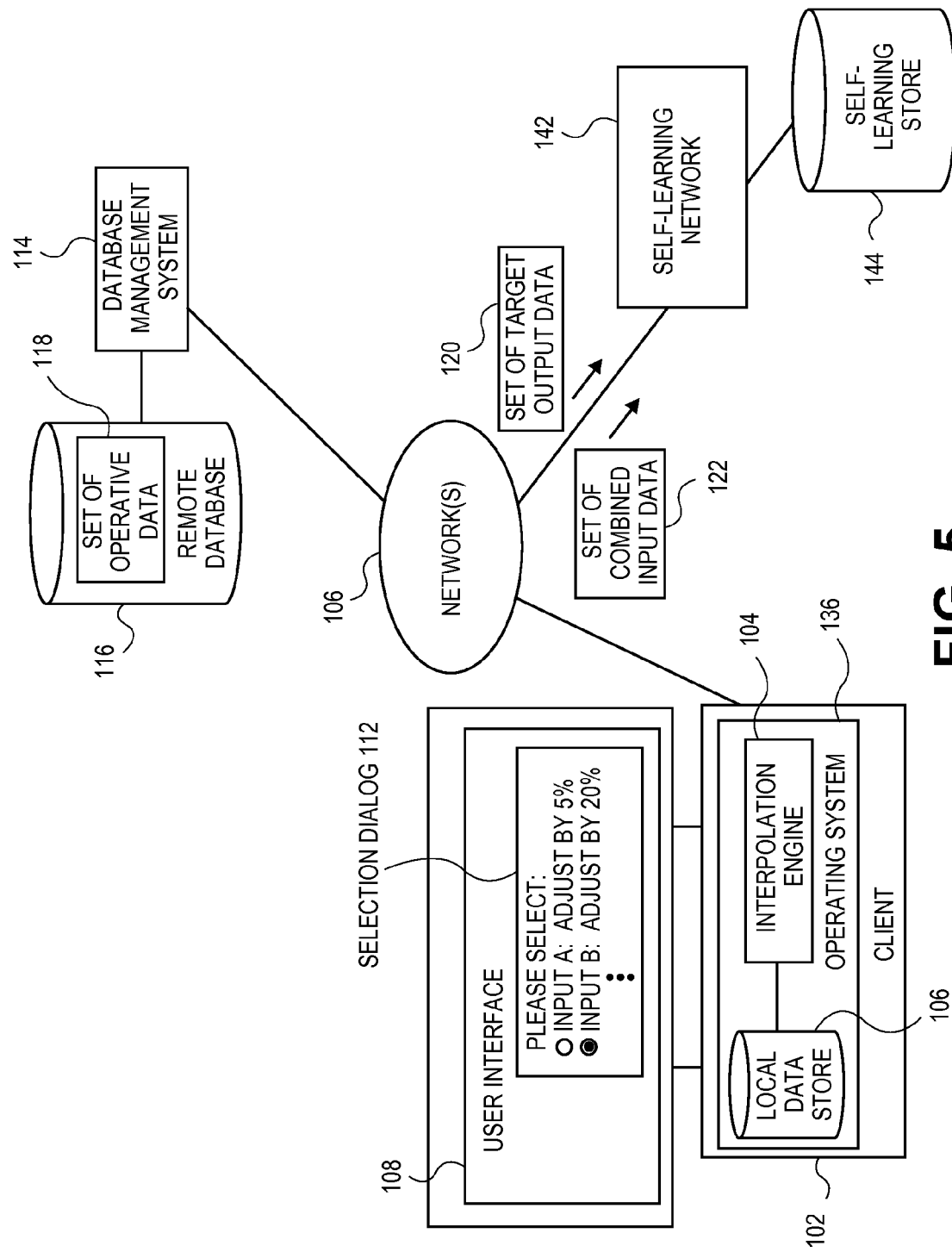
FIG. 5 illustrates an exemplary network configuration that can be used in conjunction with systems and methods for training a self-learning network using interpolated input data sets based on a target output, according to various embodiments of the present teachings.

More particularly, and as for shown in FIG. 5, in embodiments, the interpolation engine 104 of client 102 can be configured to communicate via one or more networks 106 with a self-learning network 142, such as a fuzzy logic network, a neural network, artificial intelligence (AI) networks or logic, and/or other self-learning networks, platforms, logic, and/or software. The self-learning network 142 can have an associated self-learning store 144, such as a local or remote database. While illustrated as a remote platform, it may be noted that in embodiments, the self-learning network 142 can be hosted in client 102, and/or other machines, platforms, or locations.

According to embodiments, the self-learning network 142 can receive information related to the interpolation processing and related analytics performed by the interpolation engine 104, and undergo a training process to acquire the decision logic that will permit the self-learning network 142 to perform the same, similar, and/or related processing to that of the interpolation engine 104 as operated by an analyst or other human operator. In embodiments, the data received by the self-learning network 142 can include the set of combined input data 122, the set of target output data 120, and/or other data or information. In aspects, that or other data can be transmitted directly from the client 102 hosting the interpolation engine 104 to the self-learning network. In aspects, that or other data can be accessed or retrieved by the self-learning network 142 from the database management system 114 and/or associated remote database 116, from the set of operative data 118. In aspects, the data received by the self-learning network 142 can in addition or instead be accessed or retrieved from other data stores or sources, such as for instance from a service hosted in the Internet. In aspects, the set of combined input data 122, the set of target output data 120, and/or other data or information can be stored by the self-learning network to the self-learning store 144.

Figure 6:
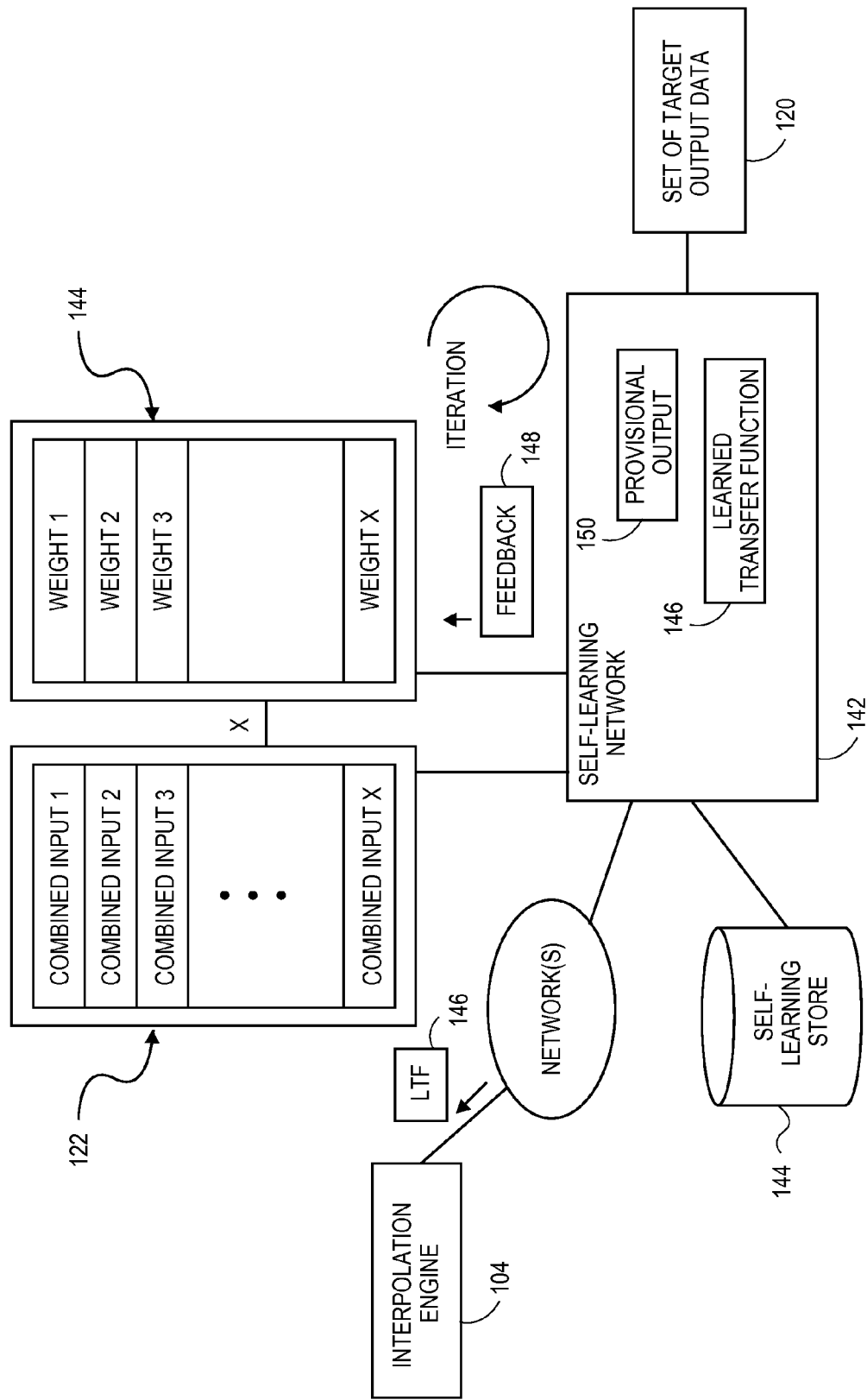
FIG. 6 illustrates an exemplary network configured to perform a training process and other activity, according to various embodiments.

In aspects, and as for instance shown in FIG. 6, after acquisition of the set of combined input data 122, the set of target output data 120, and/or other data or information captured from or related to the interpolation processing carried out by the interpolation engine 104 and/or related logic, the self-learning network 142 can perform training on those sets of data to learn and develop a learned transfer function 146, and/or other functions or input/output behaviors to reproduce, approximate, supplement, and/or otherwise interact with the same classes of data operated on by the interpolation engine 104, and produce consistent output results. In embodiments as shown, the self-learning network 142 can operate or train on the set of combined input data 122 for each of the one or more inputs or variables contained in that set. In aspects, the self-learning network 142 can operate to multiply each input or variable in the set of combined input data 122 by a corresponding weights in a set of weights 144. In aspects, the set of weights 144 can be normalized or scaled to represent a value between 0 and 1, and/or other ranges, ratios, or expressions. In aspects, the set of weights 144 can, in addition to or instead of representing static numerical values, can comprise dynamic values of functions, that may for instance be a function of the variable being multiplied or operated on. In aspects, instead of multiplication, the set of weights 144 can include other operations, such as exponentiation, linear or algebraic operators or expressions, and/or others.

In aspects, after performing the multiplication or other computation on the set of combined input data 122 by the self-learning store 144, the self-learning network 142 can determine or generate a provisional output 150 resulting from that operation, and compare that output value to the set of target output data 120. In aspects, for instance, the self-learning network 142 can subtract the provisional output 150 from the set of target output data 120, or otherwise compare the initial or other provisional output 150 to the set of target output data 120, to determine how closely they output conforms to the value reflected in the set of target output data 120. Any differences in value, or other result of the comparison, can be used to generate a feedback 148 that is transmitted or fed back to the self-learning store 144, for adjustment of those weights based on the degree of deviation between the provisional output 150 and/or other results, and the set of target output data 120. The self-learning network 142 can then iterate the process of multiplying, scaling or otherwise processing the set of combined input data 122, comparing each generation or set of the provisional output 150 to the set of target output data 120 and generating corresponding feedback 148 each time, as will be understood by persons skilled in the art. In aspects, the iteration or training process can continue until the provisional output 150 provided by the self-learning network 142 converges to the set of target output data 120, either exactly or to within a predetermined or selected tolerance range. Upon reaching convergence of the provisional output 150 with the set of target output data 120 to within a predetermined or selected marginal output range, the self-learning network 142 can register and store a learned transfer function 146 that encapsulates the input/output behavior of the interpolation engine 104, for instance to self-learning store 144.

In embodiments, the learned transfer function 146 can, for instance, be a linear, quadratic or other algebraic, exponential and/or other functions on the set of combined input data 122. In aspects, the learned transfer function 146 can be configured to operate in a forward direction, from the set of combined input data 122 to the set of target output data 120, and thereby represent a modeling function or engine for the subject data. In aspects, the learned transfer function 146 can be configured to operate in a reverse direction, from the set of target output data 120 to the set of combined input data 122, and thereby represent an approximation or replication of the interpolation engine 104, itself. In embodiments as shown, upon completion of training of the self-learning network 142 and production of the learned transfer function 146, the learned transfer function 146 can be uploaded or transmitted to one or more other platforms or locations, such as to the interpolation engine 104 on client 102. The learned transfer function 146 can then operate in conjunction with the interpolation engine 104, and/or can be incorporated in or operate with other local or remote logic, services, or platforms, for instance, in the database management system 114.

According to aspects of the teachings in certain regards, the use of the self-learning network 142 can permit the development or construction of inferences to be taken from the set of predetermined input data 124, the set of target output data 120, the set of interpolated input series 128, and/or other data that would not be feasible through the use of other rule-building techniques. For instance, an operator may apply the interpolation engine 104 to a medical study in which the distribution of a vaccine can be correlated with the incidence of cancer disease within a target patient population over a certain span of time. Thus, the set of predetermined input data 124 and/or other source data can comprise a set of data for the year 2008 in which a vaccination rate of 15% can result in an incidence of 0.5% of an identified type of cancer for patients 20 to 40 years of age, at a cost to government health care of $1.5B, as well as a set of data for year 2009 in which a vaccination rate of 18% can result in an incidence of 0.4% of the disease type in the same patient cohort at a cost to government health care of $1.78. In the interpolation scenario, the incidence of the subject disease may be known or projected to be 0.2% for the same patient age bracket for the year 2010, for which a vaccination rate of 22% would be required. In aspects of such an illustrative scenario, the interpolation engine 104 and/or other logic can determine that achieving a vaccination rate of 22% would require an expenditure by government health care of $2.1B, to which the operator may respond to reject, "flush," invalidate and/or otherwise reset the interpolated data. This can be due for instance to knowledge on the part of the operator that available funding for the relevant government health care organization is limited to $1.9B, so that implementing a vaccination plan to achieve the targeted disease incidence rate would not be possible as a public health goal. In scenarios of that type, an analytic or modeling engine which relied upon an average of the values of data from prior years might not be able to successfully imitate or approximate the decision process of the human operator, since an engine of that type might average the values including the values for year 2010 without regard to exceeding a funding threshold, and/or without taking other factors or externalities into account. According to aspects, the self-learning network 142 can in contrast track the decision-making process of the human operator to detect the sudden appearance of an apparent threshold in the funding or other variable. The self-learning network 142 can for instance account for or model that threshold by incorporating that threshold into the transfer function 146 by adjusting the set of weights 144 assigned to the vaccination rate, incidence, cost and/or other factors or variables to avoid exceeding that detected threshold, for instance by setting weights to zero for those groups of values that would cause that threshold to be exceeded. Other thresholds, trends, patterns, and/or heuristics can be detected by the self-learning network 142 from the set of predetermined input data 124, the set of target output data 120, the set of interpolated input series 128 and/or other data, and be used to infer, simulate, or otherwise reproduce the learned decision logic used by the analyst or other operator in conducting one or more interpolation and/or extrapolation study.

Figure 7:
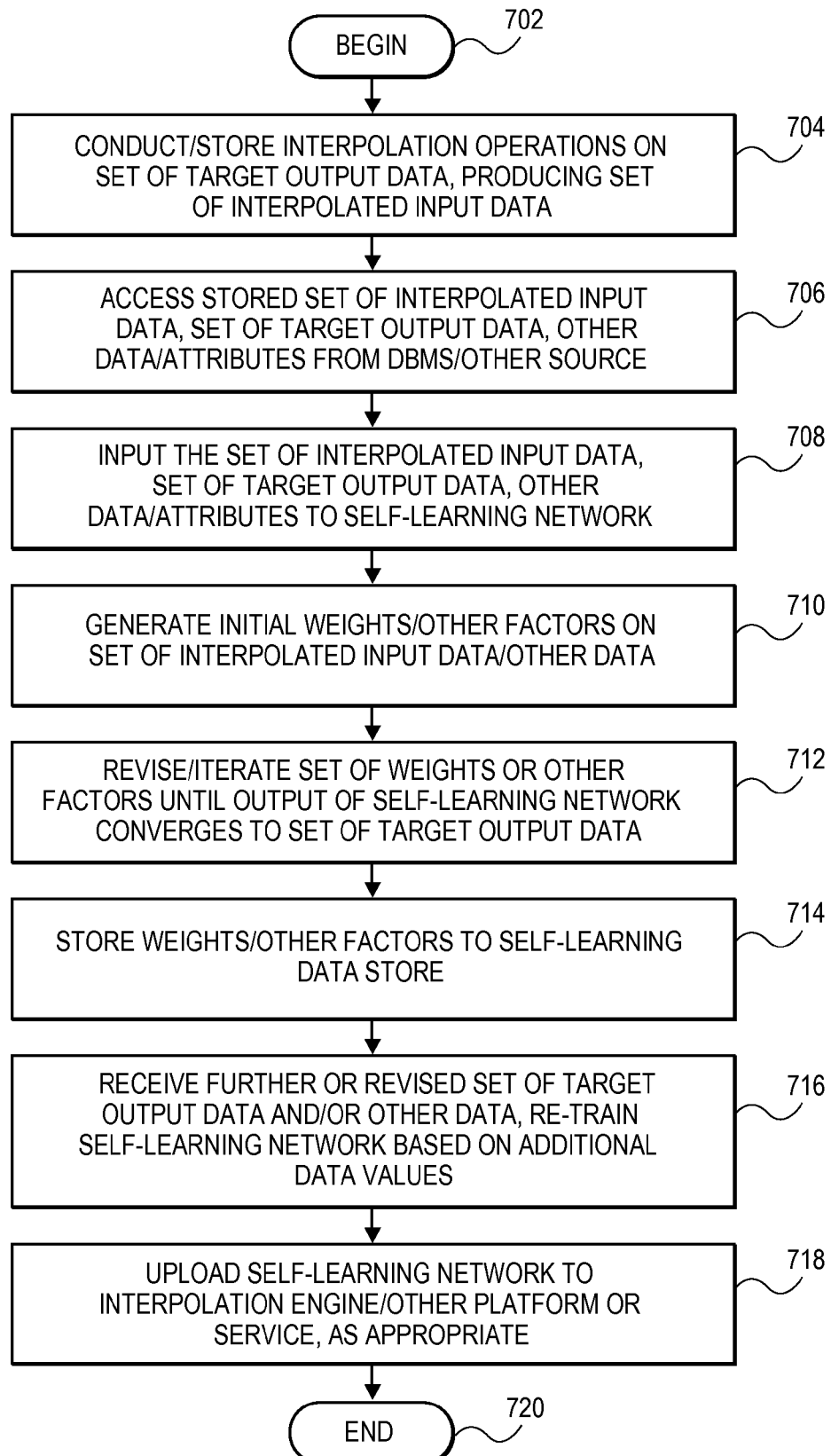
FIG. 7 illustrates a flowchart of exemplary training and other processing that can be used in connection with for training a self-learning network using interpolated input sets based on a target output, according to various embodiments.

FIG. 7 illustrates an illustration of process flow that can be used to train a self-learning network 142 using a set of interpolated input data 126 and other information, according to various embodiments. In 702, processing can begin. In 704, a user can conduct and store interpolation operations on the set of operative data 118, the set of combined input data 122, the set of target output data 120, and/other data, producing or generating the subset of interpolated input data 126, interpolation function 140, and/or other outputs. In aspects, the interpolation operations can be performed by one or more users, and/or at one or more different locations or times. In 706, the subset of interpolated input data 126, the set of target output data 120, and/or other data or attributes can be accessed or retrieved from the database management system 114, the associated remote database 116, and/or other source. In 708, the subset of interpolated input data 126, the set of target output data 120, and/or other data or attributes can be supplied as input to the self-learning network 142. In 710, the self-learning network 142 can generate an initial set of weights 144 to be applied to the set of combined input data 122 to produce the set of target data 120, for instance, by setting the weights for all inputs to one, one-half, or some other equal or arbitrary number. In aspects, the set of weights 144 can be configured to be within a range such as 0 to 1, or other scale or range, as understood by persons skilled in the art.

In 712, the self-learning network 142 can revise and/or iterate the set of weights 144 or other variables or factors until the output of the self-learning network 142 converges to the set of target output data 120. In aspects, the convergence of the output of the self-learning network 142 can be driven by developing feedback 148 and/or other data or signal based on the difference between the output of the self-learning network 142 and the set of target output 120, and adjusting the set of weights 144 until successive outputs from the self-learning network 142 converge to the set of target output data. As will be understood by persons skilled in the art, the self-learning network 142 can be or include networks such as a fuzzy logic network, a neural network, and/or other self-learning networks, platforms, logic, or engines.

In 714, the self-learning network 142 can store the set of weights 144 and/or other variables, factors, functions, or parameters to the self-learning store 144, and/or other database or location. In 716, the self-learning network 142 can receive a further or revised set of target output data 120 from the remote database 116 or other source. In aspects, the updated or revised set of target output data 120 can be generated due to additional data sets over further intervals of time being captured, or for other reasons or based on other events. In 718, the self-learning network 142 and/or components or resources of the self-learning network 142, such as the set of weights 144 or other data, can be uploaded to a remote platform or destination, such as the interpolation engine 104 of client 102, and/or other platform, machine, location, or service. In aspects, it may be noted that the self-learning network 142, when trained by the subset of interpolated input data 126 and other data supplied by or via the interpolation engine 104, can in effect reproduce or approximate with a significant degree of accuracy the modeling process of interpolation function 140, and/or that of the user or other analyst who selected or manipulated the subset of interpolated input data 126, in the first instance. It may be noted that in aspects, the self-learning network 142 when trained in the described fashion can thereafter perform modeling or other analytics on new inputs from the set of operative data 118, and produce new outputs based on those input sets. The self-learning network 142 can thereby generate predictive modeling results, or series of alternative results, in contrast to the retrodictively interpolated subset of inputs produced by the interpolation engine 104, and/or related logic. In 720, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
   accessing a set of target output data and a set of combined input data, the set of combined input data comprising a subset of predetermined input data, and a subset of interpolated input data;
   receiving the set of combined input data in a self-learning network hosted on a self-learning host machine;
   applying a set of weights to the set of combined input data;
   revising the set of weights in view of a difference between an output generated by the self-learning network and the set of target output data;
   determining that the self-learning network generates successive outputs that converge to the set of target output data in response to an application of the set of weights, as revised; and
   training, by a processor and in view of the determining, the self-learning network to generate the set of target output data in conjunction with the set of weights, as revised.

2. The method of claim 1, wherein the set of combined input data comprises at least one of a set of financial data, a set of medical data, a set of demographic data, a set of engineering data, a set of network operations data, or a set of geographic data.

3. The method of claim 1, wherein the subset of interpolated input data comprises a series of subsets of interpolated input data.

4. The method of claim 3, wherein the series of subsets of interpolated input data comprises subsets of interpolated input data generated in view of user input.

5. The method of claim 3, wherein the training the self-learning network comprises training the self-learning network in view of each of the series of subsets of interpolated input data in relation to the set of target output data.

6. The method of claim 1, wherein the self-learning host machine is remote from a client machine hosting an interpolation engine to generate the set of combined input data.

7. The method of claim 1, further comprising re-training the self-learning network in view of an additional set of target output data.

8. The method of claim 1, further comprising uploading the trained self-learning network to a remote interpolation engine.

9. The method of claim 1, wherein at least one of the set of target output data or the subset of predetermined input data are accessed from a database management system remote to a self-learning host machine.

10. The method of claim 1, wherein the self-learning network comprises at least one of a neural network or a fuzzy logic network.

11. The method of claim 10, wherein training the self-learning network comprises generating the set of weights to apply to the set of combined input data to generate the set of target output data.

12. A system comprising:
    an interface to a database to store a set of target output data and a set of combined input data, the set of combined input data comprising a subset of predetermined input data, and a subset of interpolated input data; and
    a processor to communicate with the database via the interface and to:
    receive the set of combined input data in a self-learning network hosted on a self-learning host machine,
    apply a set of weights to the set of combined input data,
    revise the set of weights in view of a difference between an output generated by the self-learning network and the set of target output data,
    compute a determination that the self-learning network generates successive outputs that converge to the set of target output data in response to an application of the set of weights, as revised, and
    train the self-learning network to generate the set of target output data in conjunction with the set of weights, as revised and in view of the determination.

13. The system of claim 12, wherein the set of combined input data comprises at least one of a set of financial data, a set of medical data, a set of demographic data, a set of engineering data, a set of network operations data, or a set of geographic data.

14. The system of claim 12, wherein the subset of interpolated input data comprises a series of subsets of interpolated input data.

15. The system of claim 14, wherein the series of subsets of interpolated input data comprises subsets of interpolated input data generated in view of user input.

16. The system of claim 14, wherein to train the self-learning network is to train the self-learning network in view of each of the series of subsets of interpolated input data in relation to the set of target output data.

17. The system of claim 12, wherein the processor is further to re-train the self-learning network in view of an additional set of target output data.

18. The system of claim 12, wherein the processor is further to upload the trained self-learning network to a remote interpolation engine.

19. The system of claim 12, wherein the self-learning network comprises at least one of a neural network or a fuzzy logic network.

20. The system of claim 19, wherein to train the self-learning network is to generate the set of weights to apply to the set of combined input data to generate the set of target output data.

* * * * *